United States Patent
Liu et al.

(10) Patent No.: US 10,455,509 B2
(45) Date of Patent: Oct. 22, 2019

(54) ENERGY EFFICIENT DATA HANDLING FOR MOBILE DEVICES

(71) Applicant: Microsoft Technology Licensing, LLC, Redmond, WA (US)

(72) Inventors: Yunxin Liu, Beijing (CN); Thomas Moscibroda, Beijing (CN); Ranveer Chandra, Bellevue, WA (US); Yongguang Zhang, Beijing (CN); Fengyuan Xu, Williamsburg, VA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 11 days.

(21) Appl. No.: 15/588,115

(22) Filed: May 5, 2017

(65) Prior Publication Data

US 2017/0245214 A1    Aug. 24, 2017

Related U.S. Application Data

(63) Continuation of application No. 14/351,548, filed as application No. PCT/CN2013/074133 on Apr. 12, 2013, now Pat. No. 9,681,378.

(51) Int. Cl.
H04W 52/02    (2009.01)
H04L 29/08    (2006.01)
(Continued)

(52) U.S. Cl.
CPC ...... *H04W 52/0225* (2013.01); *G06F 1/3209* (2013.01); *G06F 1/3275* (2013.01);
(Continued)

(58) Field of Classification Search
CPC .. G05F 1/565; G05F 1/56; H02M 2001/0032; G11C 2221/4067; H04W 52/0216; H04W 52/0229; H04W 52/0225; H04W 4/12
See application file for complete search history.

(56) References Cited

U.S. PATENT DOCUMENTS 6,236,194 B1 * 5/2001 Manabe .................. G05F 1/565
                                                                  323/274
6,260,150 B1    7/2001 Diepstraten et al.
(Continued)

FOREIGN PATENT DOCUMENTS

| CN | 101411135 A | 4/2009 |
| WO | WO2013022462 | 2/2013 |
| WO | WO2013022463 | 2/2013 |

OTHER PUBLICATIONS

"First Office Action and Search Report Issued in Chinese Patent Application No. 201380075570.0", dated Feb. 22, 2018, 11 Pages.
(Continued)

*Primary Examiner* — Ayaz R Sheikh
*Assistant Examiner* — Debebe A Asefa (57) ABSTRACT

The techniques described herein reduce a rate at which a mobile device consumes energy when receiving, processing and storing data events (e.g., emails, instant messages, social networking messages and notifications, etc.). In various embodiments, the techniques may be implemented in accordance with a connected standby mode of operation for the mobile device. Therefore, the techniques may decouple data reception from data processing when exchanging data events in the connected standby mode. In various embodiments, the techniques may store persistent memory operations for multiple data events in a temporary cache and process the stored persistent memory operations as a batch (e.g., perform the persistent memory operations together). In various embodiments, the techniques may partition data storage space allocated for data communications applications on the mobile device.

19 Claims, 6 Drawing Sheets

(51) Int. Cl.

| | |
|---|---|
| H04W 4/12 | (2009.01) |
| G06F 1/3209 | (2019.01) |
| G06F 1/3234 | (2019.01) |
| H04L 12/58 | (2006.01) |
| G06F 3/06 | (2006.01) |
| H04W 88/02 | (2009.01) |

(52) U.S. Cl.
CPC ............ *G06F 1/3278* (2013.01); *H04L 51/04* (2013.01); *H04L 67/26* (2013.01); *H04W 4/12* (2013.01); *H04W 52/0216* (2013.01); *H04W 52/0229* (2013.01); *H04W 52/0251* (2013.01); *G06F 3/067* (2013.01); *G06F 3/0625* (2013.01); *H04W 88/02* (2013.01); *Y02D 10/13* (2018.01); *Y02D 10/14* (2018.01); *Y02D 10/154* (2018.01); *Y02D 10/157* (2018.01); *Y02D 70/00* (2018.01); *Y02D 70/1224* (2018.01); *Y02D 70/1242* (2018.01); *Y02D 70/1262* (2018.01); *Y02D 70/1264* (2018.01)

(56) References Cited

U.S. PATENT DOCUMENTS

| | | |
|---|---|---|
| 7,408,506 B2 | 8/2008 | Miller |
| 7,512,822 B2 | 3/2009 | Fung |
| 9,681,378 B2 | 6/2017 | Liu et al. |
| 2001/0032300 A1* | 10/2001 | Olson ................. G06F 11/1435 711/162 |
| 2008/0081659 A1 | 4/2008 | Lim |
| 2010/0125744 A1* | 5/2010 | Hong ...................... H04L 67/24 713/323 |
| 2011/0145598 A1* | 6/2011 | Smith ................... G06F 21/554 713/190 |
| 2012/0102346 A1 | 4/2012 | Haj-Yihia |
| 2012/0159074 A1 | 6/2012 | Sodhi et al. |
| 2012/0182860 A1* | 7/2012 | Liu ..................... H04L 12/1863 370/216 |
| 2012/0264429 A1 | 10/2012 | Takizawa et al. |
| 2013/0042128 A1 | 2/2013 | Berry |
| 2014/0019677 A1* | 1/2014 | Chang ................. G06F 12/0804 711/105 |
| 2014/0229676 A1 | 8/2014 | Biswas et al. |
| 2014/0286190 A1* | 9/2014 | Vallabhu ........... H04W 52/0241 370/254 |
| 2016/0021614 A1* | 1/2016 | Liu ......................... H04W 4/12 370/311 |

OTHER PUBLICATIONS

U.S. Appl. No. 14/351,548, Amendment and Response filed Mar. 11, 2016, 24 pages.
U.S. Appl. No. 14/351,548, Amendment and Response filed Jun. 27, 2016, 27 pages.
U.S. Appl. No. 14/351,548, Amendment and Response filed Dec. 21, 2016, 16 pages.
U.S. Appl. No. 14/351,548, Notice of Allowance dated Feb. 3, 2017, 14 pages.
PCT International Preliminary Report on Patentability in PCT Application No. PCT/CN2013/074133 dated Oct. 22, 2015, 6 pages.
"3GPP Release 8", The Mobile Broadband Standard, Feb. 2013, 1 page.
Adya, et al., "Thialfi: A Client Notification Service for Internet-Scale Applications," retrieved from <<http://www.michaelpiatek.com/papers/thialfi-sosp11.pdf>>, SOSP'11, Oct. 23-26, 2011, pp. 129-142.
Angel, "Google Adopts Microsoft Sync Protocol", retrieved from <<http://www.windowsfordevices.com/c/a/News/Google-adopts-Microsoft-sync-protocol/>>, Feb. 10, 2009, 5 pages.
Athivarapu, et al., "RadioJockey: Mining Program Execution to Optimize Cellular Radio Usage," Proceedings of the 18th Annual International Conference on Mobile Computing and Networking, MobiCom'12, Aug. 2012, 12 pages.
Berard, et al., "Understanding Connected Standby", retrieved from <<http://channel9.msdn.com/Events/Build/BUILD2011/HW-456T>>, Sep. 14, 2011, 2 pages.
Carroll, et al., "An Analysis of Power Consumption in a Smartphone", Proceedings of the USENIX Conference on USENIX Annual Technical Conference, Jun. 2010, 14 pages.
Cignetti, et al., "Energy Estimation Tools for the Palm", Proceedings of the 3rd ACM International Workshop on Modeling, Analysis, and Simulation of Wireless and Mobile Systems, Aug. 2000, 8 pages.
"Configuration of Fast Dormancy in Release-8," retrieved from <<http://www.3gpp.org/ftp/tsg_ran/tsg_ran/TSGR_45/Documents/>>, 3GPP TSG-RAN#45, Tdoc RP-090960, Sep. 15-18, 2009, 3 pages.
Dogar, et al., "Catnap-Exploiting High Bandwidth Wireless Interfaces to Save Energy for Mobile Devices," Proceedings of the 8th International Conference on Mobile Systems, Applications and Services, MobiSys'10, Jun. 2010, 16 pages.
Dong, et al., "Chameleon: A Color-Adaptive Web Browser for Mobile OLED Displays", Proceeding of IEEE Transactions on Mobile Computing, vol. 11, Issue 5, May 2012, pp. 724-738.
Dong, et al, "Self-Constructive High-Rate System Energy Modeling for Battery-Powered Mobile Systems", Proceedings of the 9th International Conference on Mobile Systems, Applications and Services, MobiSys'11, Jun. 2011, 14 pages.
European Office Action dated Mar. 9, 2016 for European patent application No. 13881886.9, a counterpart foreign application of U.S. Appl. No. 14/351,548, 5 pages.
Supplementary European Search Report dated Feb. 19, 2016 for European patent application No. 13881886.9, 4 pages.
Flinn, et al., "PowerScope: A Tool for Profiling the Energy Usage of Mobile Applications" Proceedings of the Second IEEE Workshop on Mobile Computer Systems and Applications, Feb. 1999, pp. 1-9.
Foley, "Apple Finally Acknowledges iPhone's Exchange Support", retrieved from <<http://www.zdnet.com/blog/microsoft/apple-finally-acknowledges-iphones-exchange-support/1246>>, Mar. 6, 2008, 11 pages.
Foresman, "How Smartphones are Bogging Down Some Wireless Carriers", Gear & Gadgets Product News & Reviews, retrieved from <<http://arstechnica.com/gadgets/2010/02/how-smartphones-are-bogging-down-some-wireless-carriers/>>, Feb. 22, 2010, 7 pages.
Han, et al., "DozyAP: Power-Efficient Wi-Fi Tethering," Proceedings of the 10th International Conference on Mobile Systems, Applications and Services, MobiSys'12, Jun. 2012, 14 pages.
Jung, et al., "DevScope: A Nonintrusive and Online Power Analysis Tool for Smartphone Hardware Components," Proceedings of the Eighth IEEE/ACM/TFIP International Conference on Hardware/Software Codesign and Systems Synthesis, CODES+ISSS'12, Oct. 2012, 10 pages.
Kiani, et al., "Context-Aware Service Utilisation in the Clouds and Energy Conservation", Journal of Ambient Intelligence and Humanized Computing, May 2012, pp. 1-26.
Lampson, "Lazy and Speculative Execution," retrieved from <<http://research.microsoft.com/en-us/um/people/blampson/Slides/LazyAndSpeculative.pdf>>, OPODIS, Dec. 12, 2006, pp. 1-27.
"[MS-ASCMD]: ActiveSync Command Reference Protocol Specification", Retrieved on Feb. 8, 2013, at <<http://msdn.microsoft.com/en-us/library/dd299441(v=exchg.80).aspx>>, 2 pages.
"Microsoft Direct Push" retrieved on Feb. 8, 2013, at <<http://technet.microsoft.com/en-us/library/cc539119.aspx>>, 3 pages.
Mittal, et al., "Empowering Developers to Estimate App Energy Consumption", Proceedings of the 18th Annual International Conference on Mobile Computing and Networking, MobiComm'12, Aug. 2012, 11 pages.
"Monsoon Power Monitor", Monsoon Solutions, Inc., retrieved on Feb. 8, 2013, at <<http://www.msoon.com/LabEquipment/PowerMonitor/>>, 1 page.

(56) References Cited

OTHER PUBLICATIONS

Office action for U.S. Appl. No. 14/351,548, dated Dec. 23, 2015, Liu et al., "Energy Efficient Data Handling for Mobile Devices", 25 pages.

Office action for U.S. Appl. No. 14/351,548, dated Apr. 14, 2016, Liu et al., "Energy Efficient Data Handling for Mobile Devices", 30 pages.

Office action for U.S. Appl. No. 14/351,548, dated Sep. 22, 2016, Liu et al., "Energy Efficient Data Handling for Mobile Devices", 31 pages.

Pathak, et al., "Fine-Grained Power Modeling for Smartphones Using System Call Tracing", Proceedings of the Sixth Conference on Computer Systems, EuroSys'11, Apr. 2011, 15 pages.

Pathak, et al., "What is keeping my phone awake? Characterizing and Detecting No-Sleep Energy Bugs in Smartphone Apps", Proceedings of the 10th International Conference on Mobile Systems, Applications and Services, MobiSys'12, Jun. 2012, pp. 267-280.

PCT Search Report & Written Opinion for PCT Application No. PCT/CN2013/074133 dated Jan. 16, 2014, 11 pages.

Qian, et al., "TOP: Tail Optimization Protocol for Cellular Radio Resource Allocation," Proceedings of the 18th IEEE International Conference on Network Protocols, Oct. 2010, pp. 285-294.

Ra, et al., "Improving Energy Efficiency of Personal Sensing Applications with Heterogeneous Multi-Processors" Proceedings of the 14th International Conference on Mobile Systems, Applications, and Services, UbiComp'12, Sep. 2012, 10 pages.

"TCPDUMP & LIBPCAP" retrieved on Feb. 8, 2013, at <<http://www.tcpdump.org/>>, 2 pages.

"Wireshark," retreieved on Feb. 8, 2013, at <<http://www.wireshark.org/>>, 4 pages.

Xu, et al., "Optimizing Background Email Sync on Smartphones," retrieved from <<http://research.microsoft.com/en-us/um/people/moscitho/publications/mobisys_2013.PDF>>, MobiSys'13, Jun. 28, 2013, 14 pages.

Yoon, et al., "AppScope: Application Energy Metering Framework for Android Smartphones using Kernel Activity Monitoring," Proceedings of the USENIX Conference on Annual Technical Conference, Jun. 2012, 14 pages.

Zhang, et al., "Accurate Online Power Estimation and Automatic Battery Behavior Based Power Model Generation for Smartphones", Proceedings of the Eighth IEEE/ACM/IFIP International Conference on Hardware/Software Codesign and System Synthesis, CODES+ISSS'10, Oct. 2010, 10 pages.

\* cited by examiner

ENERGY EFFICIENT DATA HANDLING FOR MOBILE DEVICES

PRIORITY APPLICATION

This application is a continuation of, and claims priority from, U.S. application Ser. No. 14/351,548, filed on Apr. 11, 2014, now pending, which is a 35 U.S.C. 371 National Stage Entry of and claims priority from PCT Application Serial No. PCT/CN2013/074133, titled "Energy Efficient Data Handling for Mobile Devices", filed on Apr. 12, 2013, the entire contents of which are all incorporated herein by reference.

BACKGROUND

Today, mobile devices such as smartphones are used to exchange a large amount of data over networks. A mobile device may be pre-configured with data communications applications (e.g., voice and messaging) and/or a user of the mobile device may initiate the installation of additional data communications applications such as an email client or other types of messaging clients. Certain types of data communications applications may be configured to receive data from network servers, process the data, and store the data on the mobile device for immediate or future user access. The data may include, but is not limited to, emails, instant messages, social application messages or notifications, gaming messages or notifications, short messages, and/or other data.

However, existing mobile devices consume large amounts of energy to receive and process incoming data. A mobile device includes a data network interface to receive the data and an operating system to help process the data. When the data network interface and/or the operating system are working to receive and process the data, the mobile device consumes a significant amount of energy, which may drain power from a battery of the mobile device. For example, existing mobile devices couple data processing with data reception. This unnecessarily delays the mobile device from being able to place the data network interface in a lower energy consumption state after receiving data. In another example, existing mobile devices fail to optimize memory management, and thus, the operating system of the mobile device operates in a high energy consumption state for longer periods of times when processing and storing received data.

SUMMARY

The techniques described herein reduce a rate at which a mobile device consumes energy when receiving, processing and storing data events (e.g., emails, instant messages, social networking messages and notifications, etc.). In various embodiments, the techniques may be implemented in accordance with a connected standby mode of operation for the mobile device. Therefore, the techniques may decouple data reception from data processing when exchanging data events in the connected standby mode. In various embodiments, the techniques may store persistent memory operations for multiple data events in a temporary cache and process the stored persistent memory operations as a batch (e.g., perform the persistent memory operations together). In various embodiments, the techniques may partition data storage space allocated for data communications applications on the mobile device.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, algorithms, components, modules, and/or technique(s) as permitted by the context above and throughout the document.

BRIEF DESCRIPTION OF THE CONTENTS

The detailed description is presented with reference to accompanying figures. In the figures, the left-most digit(s) of a reference number identifies the figure in which the reference number first appears. The use of the same reference numbers in different figures indicates similar or identical items.

DETAILED DESCRIPTION

The techniques described herein implement energy-efficient data handling on mobile devices operating in a connected standby mode. As used herein, data received and processed by a mobile device may be associated with emails, instant messages, social application messages or notifications, gaming messages or notifications, short messages, and/or any other data messages or notifications that may be communicated to a mobile device. Each instance of data exchanged between a data server and the mobile device may be referred to as a data event (e.g., an individual email, an individual message, an individual notification, a portion of an email, etc.). The mobile device may begin to receive and process a data event after determining that data is ready to be communicated or downloaded from a network server to a mobile device (e.g., upon the receipt of a push notification, a pull event, polling a data server, etc.).

As mobile devices continue to evolve, the users of the mobile devices become more dependable on mobile device functionality. Thus, the timely exchange of data is important. For example, a user of a mobile device may rely on an email client to sync with an email exchange server to receive important messages related to work or employment. In another example, a user of a mobile device may enjoy using a social networking application to receive messages and notifications (e.g., message board posts, check-ins, personal messages, etc.). To preserve energy, the mobile device may be configured to operate in a connected standby mode. The connected standby mode is an operating mode of the mobile device where a user is not interacting with the mobile device (e.g., not making a phone call, not typing a message, not browsing information, not playing a game). Thus, the display screen and other mobile device functionality that generally consumes large amounts of energy may be turned off in the connected standby mode, yet the mobile device is still able to receive and process a data event in the background.

The mobile device is configured to maintain a persistent connection, such as a Transmission Control Protocol (TCP) connection, to a data network in the connected standby mode. Moreover, the connected standby mode has a low energy consumption state and a high energy consumption state. In the low energy consumption state of the connected standby mode, the mobile device places the data network interface in a sleep state with limited functionality. However, the data network interface is able to receive various incoming data events (e.g., a "push" notification from a network server) when sleeping in the low energy consumption state of the connected standby mode. When the mobile device receives a notification of a data event to be communicated while operating in the low energy consumption state of the connected standby mode, it switches to a more functional data reception and processing mode. The more functional data reception and processing mode is the higher energy consumption state of the connected standby mode because the data network interface is fully activated to receive data associated with the data event and the data network interface wakes up the operating system so that the data can be processed in the background even though the user is still not actively interacting or using the mobile device (e.g., the display screen is still turned off).

In some embodiments, the mobile device may automatically wake up the operating system, using a pre-defined timer, so that the operating system can instruct the data network interface to poll a network server to determine if a data event is ready to be communicated (e.g., a "pull" event) while the mobile device is operating in the low energy consumption state of the connected standby mode.

In various embodiments, the techniques discussed herein preserve energy of the mobile device, or reduce the energy consumption rate of the mobile device, by decoupling data processing from data reception on the mobile device when the mobile device is operating in the connected standby mode. Conventionally, data reception and data processing on a mobile device are coupled to one another when the mobile device is operating in the connected standby mode. For example, the mobile device receives first data (e.g., a first data event), processes the first data, and then sends a processing acknowledgment indicating successful completion of the data processing to a network server before the mobile device can begin receiving and processing the next data event. During the processing of the first data, the data network interface may unnecessarily be operating in the high energy consumption state of the connected standby mode even though network communications may be idle (e.g., the network data interface is not transmitting or receiving data), thereby wasting energy of a power supply operating the mobile device.

By decoupling the data reception from the data processing, the mobile device may complete the network transfer after receiving all data without waiting for the data event to be fully processed and completed. Thus, the mobile device may be configured to terminate the maintenance of active network connectivity immediately after downloading all relevant data, and the mobile device may keep the "unprocessed" data for later processing, after the network connection is terminated and the data network interface is placed in the low energy consumption state (e.g., the sleep state) of the connected standby mode. Then the operating system of the mobile device may complete the processing of the unprocessed data when the data network interface is operating in the sleep state. This scenario improves energy efficiency of the mobile device because the data network interface is not operating in the high energy consumption state of the connected standby mode when it is not exchanging data.

In various embodiments, the techniques preserve energy of the power supply operating the mobile device by temporarily storing persistent memory operations (e.g., flash disk writes) associated with data events that have been received and processed while the mobile device is operating in the connected standby mode, and then performing the persistent memory operations together at a later time (e.g., batch processing). Data communications applications on existing mobile devices typically write data to persistent memory immediately after each individual data event is received and processed. That is, the existing mobile devices typically perform a write for a data event regardless of the amount of data to write (e.g., even when the write is associated with a small amount of data such as an email header and limited textual content of an email body). Experiments have shown that each of these individual persistent memory operations consume a large amount of energy due to the extended use of the operating system and/or other device resources. Accordingly, the techniques discussed herein may temporarily store persistent memory operations and the data involved in the persistent memory operations in a cache until a trigger provides an indication to perform the persistent memory operations (e.g., commit or flush the writes to persistent memory as a group). The trigger may be associated with a pre-defined data threshold (e.g., 50 kilobytes, 100 kilobytes, 500 kilobytes, etc.), a predetermined number of persistent memory operations (e.g., ten disk writes), or the trigger may identify other power consuming activities being performed on the mobile device and piggyback the batch processing of the persistent memory operations with the other activities. Accordingly, the techniques may perform the persistent memory operations for multiple data events together, thereby conserving energy of the power supply operating the mobile device.

In various embodiments, the techniques preserve energy of a power supply operating the mobile device by partitioning data storage space allocated to a particular application or other communications functionality. Experiments have shown that the amount of data processing required to handle data events for a particular application (e.g., an email application) depends on a size of the data storage space (e.g., an email inbox). For example, a mobile device may expend more energy, due to a longer processing time, storing data events in a larger email inbox (e.g., 10,000 emails) compared to a smaller email inbox (e.g., 200 emails). One reason for this is because the operating system and application executing on the mobile device may have to analyze, search, and/or update a large amount of metadata for the data events stored (e.g., thread or conversation matching, organizational information, timing information, word searching, etc.). In some embodiments, the data network interface may be in a high energy consumption state of the connected standby mode even though no data is being exchanged on the network while the metadata is being analyzed, searched, and/or updated. The techniques discussed herein mitigate this problem by enabling faster processing of data events and searching of data events by partitioning the data storage space into a small partition area for recently received data events and a large partition area for older data events.

Accordingly, the techniques discussed herein are able to reduce a rate at which a mobile device consumes energy when receiving and processing data events in the connected standby mode by decoupling the data reception from the data processing, batch processing persistent memory operations, and/or partitioning data storage space allocated for data communications applications on the mobile device (e.g., email applications, social networking applications, etc.).

Figure 1:
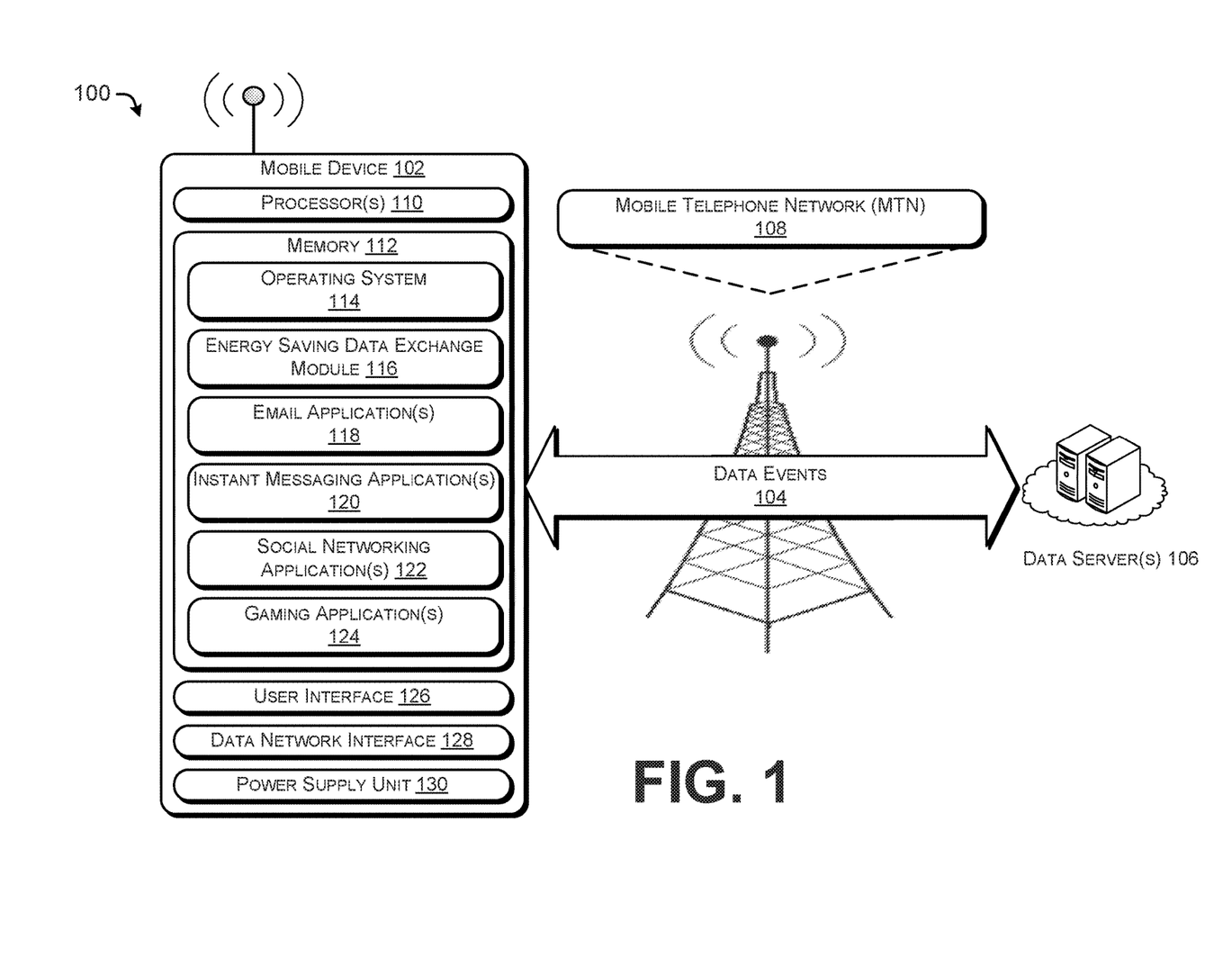
FIG. 1 illustrates an example overview of a mobile device configured with a module to handle data events in an energy-efficient manner, in accordance with various embodiments.

FIG. 1 illustrates an example environment 100 where a mobile device 102 may exchange data events 104 with one or more data servers 106 (e.g., Web servers, data servers, email servers, game servers, social network servers, cloud servers, file transfer servers, etc.) over a mobile telephone network (MTN) 108. As discussed above, each data event 104 may include unprocessed data to be received by the mobile device 102 once a data network interface is woken up from a low energy consumption state of the connected standby mode (e.g., a sleep state). The mobile device 102 may include, but is not limited to, smartphones, mobile phones, cell phones, tablet computers, portable computers, laptop computers, personal digital assistants (PDAs), electronic book devices, gaming consoles, personal media player devices, or any other portable electronic devices that may exchange (e.g., receive and/or transmit) data over the MTN 108.

In various embodiments, the mobile device 102 may comprise one or more processors 110 and memory 112. The memory 112 may include an operating system 114 and an energy saving data exchange module 116. The operating system 114 may include any known mobile operating system configured to operate the mobile device 102.

The energy saving data exchange module 116 is configured to efficiently handle the data events 104 for data communications applications on the mobile device 102 when the mobile device 102 is operating in the connected standby mode. The data communications applications preconfigured on the mobile device and/or installed on the mobile device 102 may include email applications 118, instant messaging applications 120, social networking applications 122, gaming applications 124, and/or other data exchange applications configured to receive and/or store the data events 104 received from the data servers 106.

In various embodiments, the mobile device 102 may also comprise a user interface 126 to display the data to a user associated with the mobile device 102 and functionality to receive input from the user (e.g., touch input, buttons, keys, microphones, sensors, etc.), a data network interface 128 configured to receive data from data servers 106 and/or transmit data to data servers 106, and a power supply unit 130. The power supply unit 130 may be a battery or any other rechargeable power source that can be depleted during operation of the mobile device 102.

The processor(s) 110 may be a single processing unit or a number of units, all of which could include multiple computing units. The processor(s) 110 may be implemented as one or more microprocessors, microcomputers, microcontrollers, digital signal processors, central processing units, state machines, logic circuitries, system on chip (SoC), and/or any other devices that manipulate signals based on operational instructions. Among other capabilities, the processors 110 may be configured to fetch and execute computer-readable instructions stored in the memory 112.

The memory 112 may comprise computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media may embody computer-readable instructions, data structures, program modules, or other data in a modulated data signal, such as a carrier wave. As defined herein, computer storage media does not include communication media.

The MTN 108 may be configured to implement one or more of the second, third, and fourth generation (2G, 3G, and 4G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, is an example of 4G telecommunications technologies. The infrastructure that makes up the MTN 108 may comprise multiple different components or devices (also referred to as nodes) that are configured to generate, transmit, receive, relay, and/or route data so that data services can be requested by, and provided to, the mobile device 102. Moreover, the mobile device 102 may be subscribed to a data plan offered by one or more service providers or network communication providers that implement the telecommunications networks. Different types of MTN nodes in the GSM, UMTS, LTE, LTE Advanced, and/or HSPA+ telecommunications technologies may include, but are not limited to, a combination of: base transceiver stations BTSs (e.g., NodeBs, Enhanced-NodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), or any other data traffic control entity configured to communicate and/or route data packets between the client device 102 and the data servers 106. While FIG. 1 illustrates an MTN 108, it is understood in the context of this document, that in other embodiments, the techniques discussed herein may be implemented in other networking technologies, such as a wide area network (WAN), metropolitan area network (MAN), local area network (LAN), neighborhood area network (NAN), personal area network (PAN), or the like.

Figure 2:
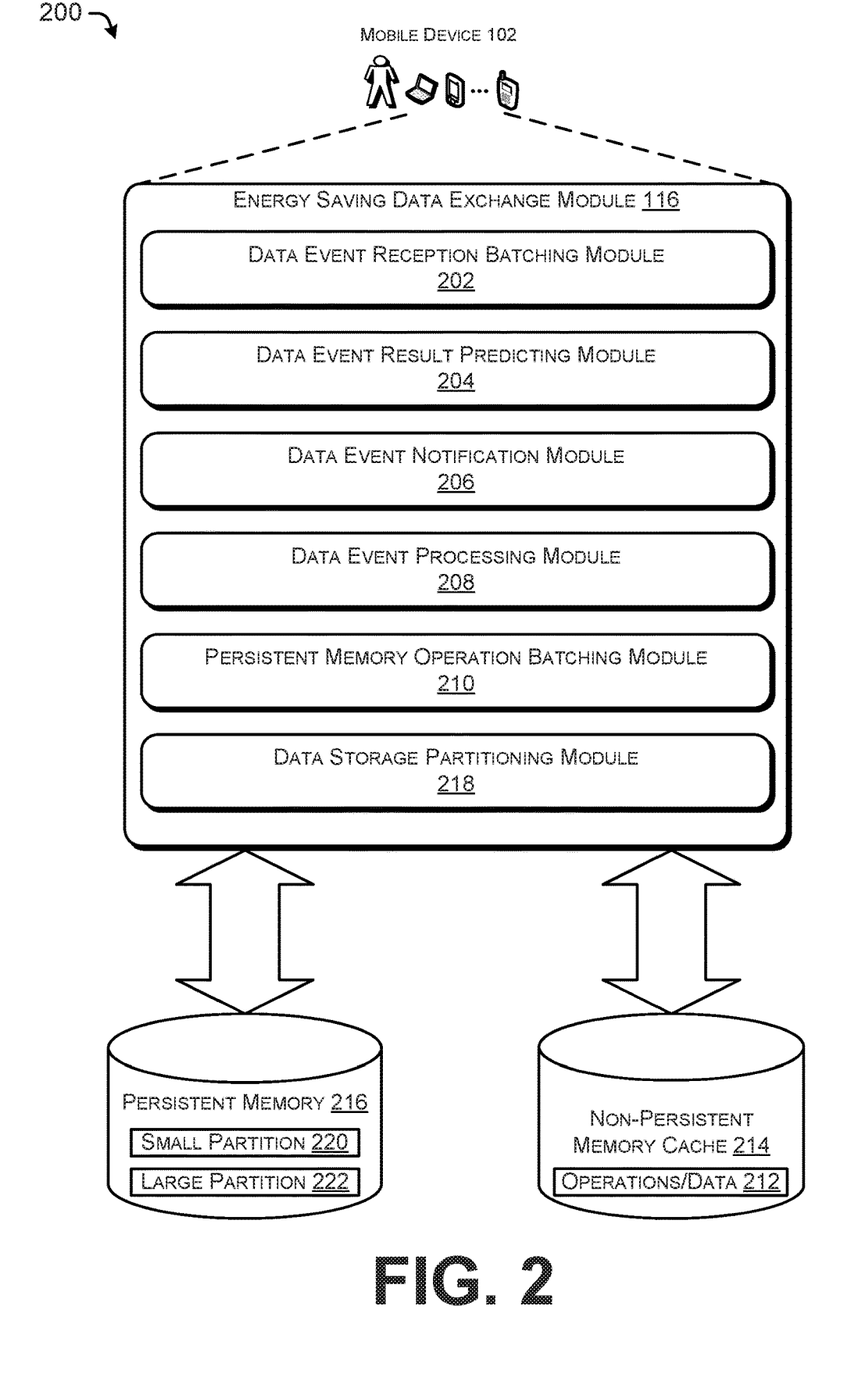
FIG. 2 illustrates additional modules to handle data events in an energy-efficient manner, in accordance with various embodiments.

FIG. 2 further illustrates modules and components associated with the energy saving data exchange module 116 that may implement the techniques described herein. As mentioned above, the energy saving data exchange module 116 may include logic and instructions to handle data events in an energy-efficient manner. Therefore, the modules and components associated with the energy saving data exchange module 116 illustrated in FIG. 2 may be part of a separate module configured to handle data events for the various communications applications in FIG. 1, may be part of the operating system 114, may be part of individual ones of the various communications applications (e.g., modify source code of an application), or a combination thereof. To this end, the functionality performed by the energy saving data exchange module 116 may be implemented with respect to different network communications protocols and/or for each of the various communications applications on the mobile device 102. Moreover, the functionality performed by the energy saving data exchange module 116 may be implemented in association with a database manager configured to manage the storage of the received data events.

In various embodiments, the energy saving data exchange module 116 may include a data event reception batching module 202. The data event reception batching module 202 is configured to batch (e.g., hold, store, maintain, etc.) the unprocessed data for multiple data events together. That is, the data event reception batching module 202 may receive unprocessed data for subsequent data events received at the mobile device 102 even though processing of a first data event may not be completed. For example, the data event reception batching module 202 may batch multiple different emails received by the data network interface 128 from an exchange server, before the operating system 114 and an email application 118 complete processing the unprocessed data for the individual data events. In some embodiments, the data event reception batching module 202 may batch multiple different data events received by the data network interface 128 before the operating system 114 and an email application 118 begin processing the unprocessed data for the individual data events (e.g., temporarily stores the unprocessed data until the operating system 114 and an email application 118 begins batch processing the data events).

Some network protocols used to exchange data events may require that the mobile device 102 send a notification, e.g., to an exchange server, that a first data event (e.g., the first unprocessed data) has successfully been processed before the exchange server transmits a second data event. That is, network protocols used to exchange data events may depend on a result of the data processing before data reception can resume, and this may present an obstacle for the data event reception batching module 202 when batching multiple data events. For example, an email exchange server may require an email client to indicate that processing of a previous email or previous portion of an email (e.g., the first data event) is finished and/or is successful before the email client can start receiving the next email or the next portion of the email (e.g., the second data event).

Therefore, in various embodiments, the energy saving data exchange module 116 may include a data event result predicting module 204. The data event result predicting module 204 is configured to predict a result of the data processing of an individual data event. Once the data event result predicting module 204 predicts the successful processing result, a data event notification module 206 is configured to send an indication, to a corresponding data server 106, that the data network interface 128 of the mobile device 102 is ready to receive the next data event. The indication may include the predicted result of the data event. The data server 106, upon receiving the indication and/or the predicted result, may then begin to transmit the second data event and the data event reception batching module 202 can then batch unprocessed data for multiple events without waiting for processing of each data event to be completed.

In some embodiments, network protocols may not require notification of successful processing results for data events. Thus, the data event notification module 206 may be configured to send an indication to the data server that the data network interface 128 and the mobile device 102 have received the previous data event and are ready to receive the next data event. As discussed above, the data event notification module 206 sends the indication before processing of the previous data event is completed, or before processing of the previous data event has begun.

In various embodiments, the energy saving data exchange module 116 may include a data event processing module 208. The data event processing module 208 is configured to process the unprocessed data for the batched data events. In various embodiments, the data event processing module 208 may wait to process the batched data events until all the data events are received at the mobile device 102 (e.g., all emails or all portions of a large email have been pushed to the mobile device 102 by the data server 106 or pulled from the data server 106 by the mobile device 102). In other embodiments, the data event processing module 208 may begin processing the data events as they are received even though the reception of subsequent data events is not dependent upon, or coupled to, the completion of processing the previous data event.

Figure 4:
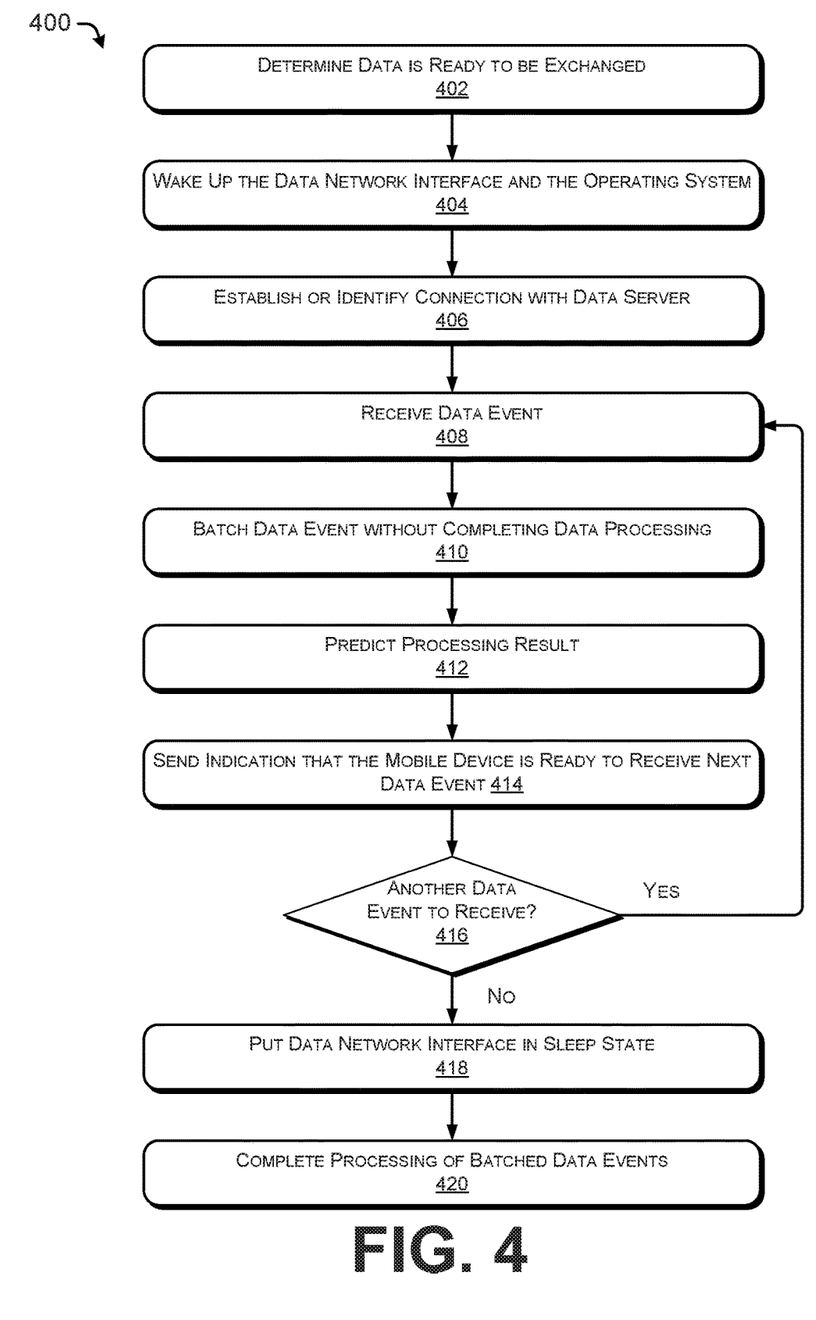
FIG. 4 illustrates an example process that decouples data reception from data processing, in accordance with various embodiments.

The data event reception batching module 202, the data event result predicting module 204, the data event notification module 206, and the data event processing module 208 are further discussed herein with respect to FIG. 4.

In various embodiments, the energy saving data exchange module 116 may include a persistent memory operation batching module 210. The persistent memory operation batching module 210 is configured to batch (e.g., temporarily store or hold) persistent memory operations, such as persistent memory writes, and data 212 in a non-persistent memory cache 214 until a trigger provides an indication to perform the batched persistent memory operations together (e.g., commit or flush the data to persistent memory as a batch). For example, instead of an email application 118 issuing individual small write operations to persistent memory 216 after each individual email is received and processed, the email application 118 may batch the multiple small writes and the data together in the non-persistent memory cache 214, and then commit or flush the batch as a group to the persistent memory 216 at a later time. Examples of persistent memory 216 may include flash-based or other solid-state storage devices, disks, or memory cards.

In at least one implementation, the trigger provides the indication to perform the batched persistent memory operations when a predefined data threshold is satisfied. The predefined data threshold may be a number of writes (e.g., three, five, seven, ten, etc.) or a total amount of data to write (e.g., 50 kilobytes, 100 kilobytes, 500 kilobytes, etc.). In an alternative implementation, the trigger may provide the indication to perform the batched persistent memory operations when an application performs an automatic update of a data storage space (e.g., update an email inbox) or a user initiates an update of a data storage space by interacting with the application or requesting an update.

The persistent memory operation batching module 210 is able to conserve energy (e.g., extend the life of the power supply unit 130) because it is energy-efficient to batch persistent memory operations and data 212 in a non-persistent memory cache 214 instead of write individual data events to persistent memory 216 immediately after each data event is received and processed (which is time consuming and energy expensive). The batching of persistent memory operations is particularly useful when an individual persistent memory operation involves a small amount of data to write (e.g., an email header and a small portion of text from the body of the email). Moreover, experiments have shown that an individual persistent memory operation associated with a small amount of data (e.g., a single data event write) and batched persistent memory operations associated with a large amount of data (e.g., multiple data event writes) have similar energy consumption rates.

Figure 5:
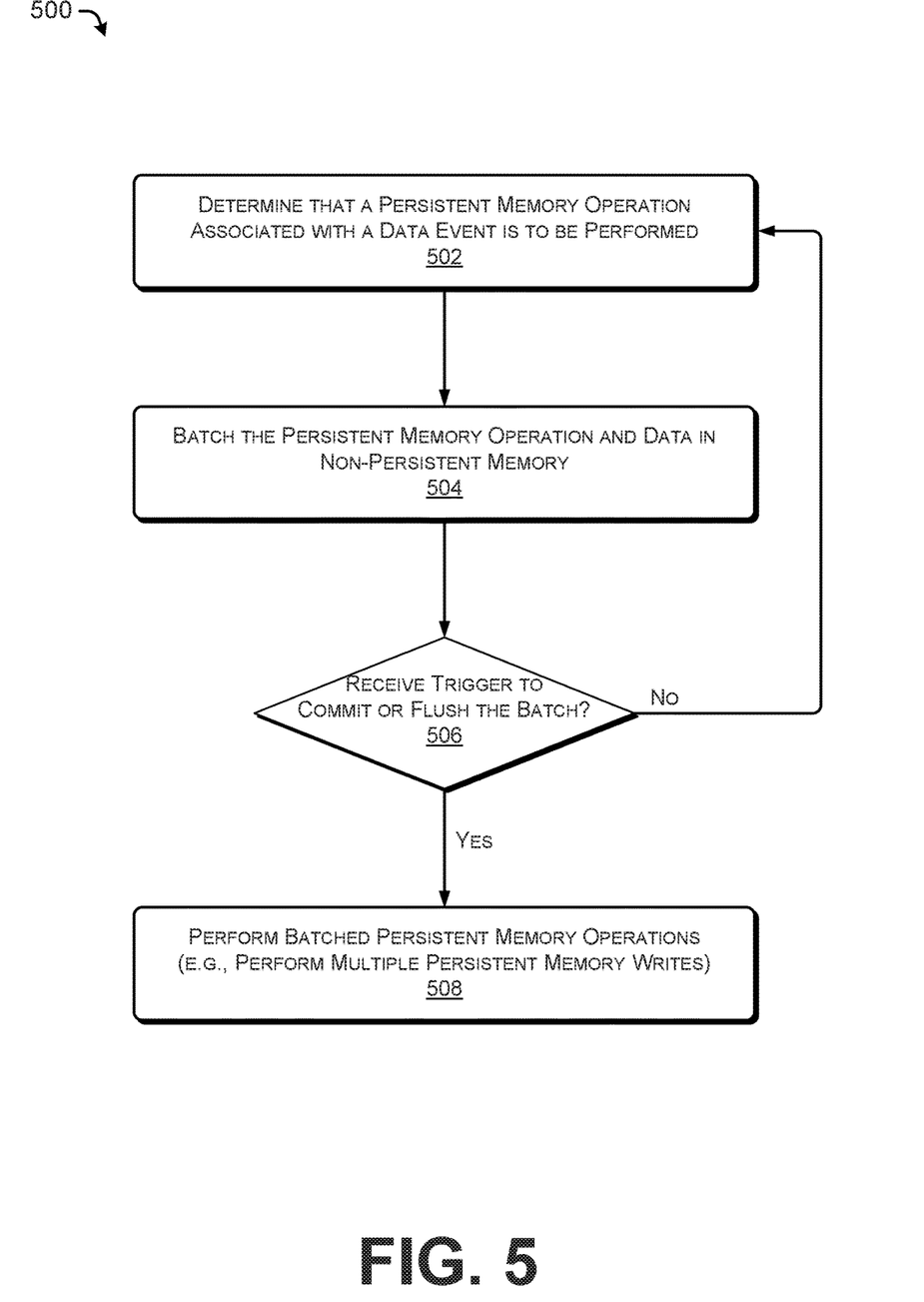
FIG. 5 illustrates an example process that batch processes persistent memory operations for multiple data events, in accordance with various embodiments.

The persistent memory operation batching module 210 is further discussed herein with respect to FIG. 5.

In various embodiments, the energy saving data exchange module 116 may include a data storage partitioning module 218. The data storage partitioning module 218 is configured to separate data storage space allocated to an application into a small partition 220 and a large partition 222. In various embodiments, the data storage space is allocated to a particular communications application, such as those illustrated in FIG. 1, and the data storage space may be located in the persistent memory 216. Accordingly, in various embodiments, each application may have its own allocated data storage space (e.g., message or notification inbox).

As mentioned above, an amount of energy used by the mobile device 102 to receive a data event or search for a data event (e.g., an email) increases significantly when an amount of allocated data storage space (e.g., an email inbox) has a large size. One reason the mobile device 102 uses more energy is because existing mobile devices are capable of storing a large number of emails (e.g., 10,000 emails), and it takes more time for the operating system and other device resources to update or search metadata information associated with the large number of emails. For example, an email client may search the entire email inbox to ensure that a recently received email is associated with the correct conversation thread or string of emails. Accordingly, when the allocated data storage space stores a large amount of data (e.g., 10,000 emails), the mobile device 102 expends a large amount of energy to appropriately store new emails and update the metadata for the large data storage space. Moreover, when the allocated data storage space stores a large amount of data, the mobile device 102 may expend more energy when a user searches the email inbox for a particular email.

Therefore, to reduce the energy consumption associated with receiving and storing a new data event, or searching for a data event, the data storage partitioning module 218 uses a small partition 220 to store data events received within a predetermined time period (e.g., "recent" emails received in the last two days, last week, last two weeks, and so forth) and a large partition 222 to store the older data events that are not received in the predetermined time period. In one implementation, the data storage partitioning module 218 may use the small partition 220 to store a threshold number of more recent data events (e.g., the fifty most recent emails).

Thus, the data storage partitioning module 218 uses the small partition 220 to handle data events recently received. For example, an email application 118 may insert a just received email into the small partition 220 and update the metadata in the small partition 220 without having to update the metadata associated with the older emails stored in the large partition 222. Thus, the mobile device 102 can preserve energy even if the mobile device 102 is configured to store a large number of emails (e.g., 10,000 emails).

The partitioning of the data storage space provides an efficient way of preserving energy because users are more likely to use the mobile device 102 to access (e.g., read) recently received data events. Therefore, the mobile device 102 may not need to update the metadata for the older data events as often. If a user desires to access an older data event (e.g., search an email inbox for an older email), the applications on the mobile device 102 can search both the small partition 220 and the large partition 222 and return the combined results. Moreover, the data storage partition module 218 may determine or identify an opportunity (e.g., a time) to move data events in the small partition 220 to the large partition 222 and update the metadata accordingly. As users typically access (e.g., search for) older data events less frequently than recently received data events, the data partitioning is able to preserve energy of the power supply unit 130.

Figure 6:
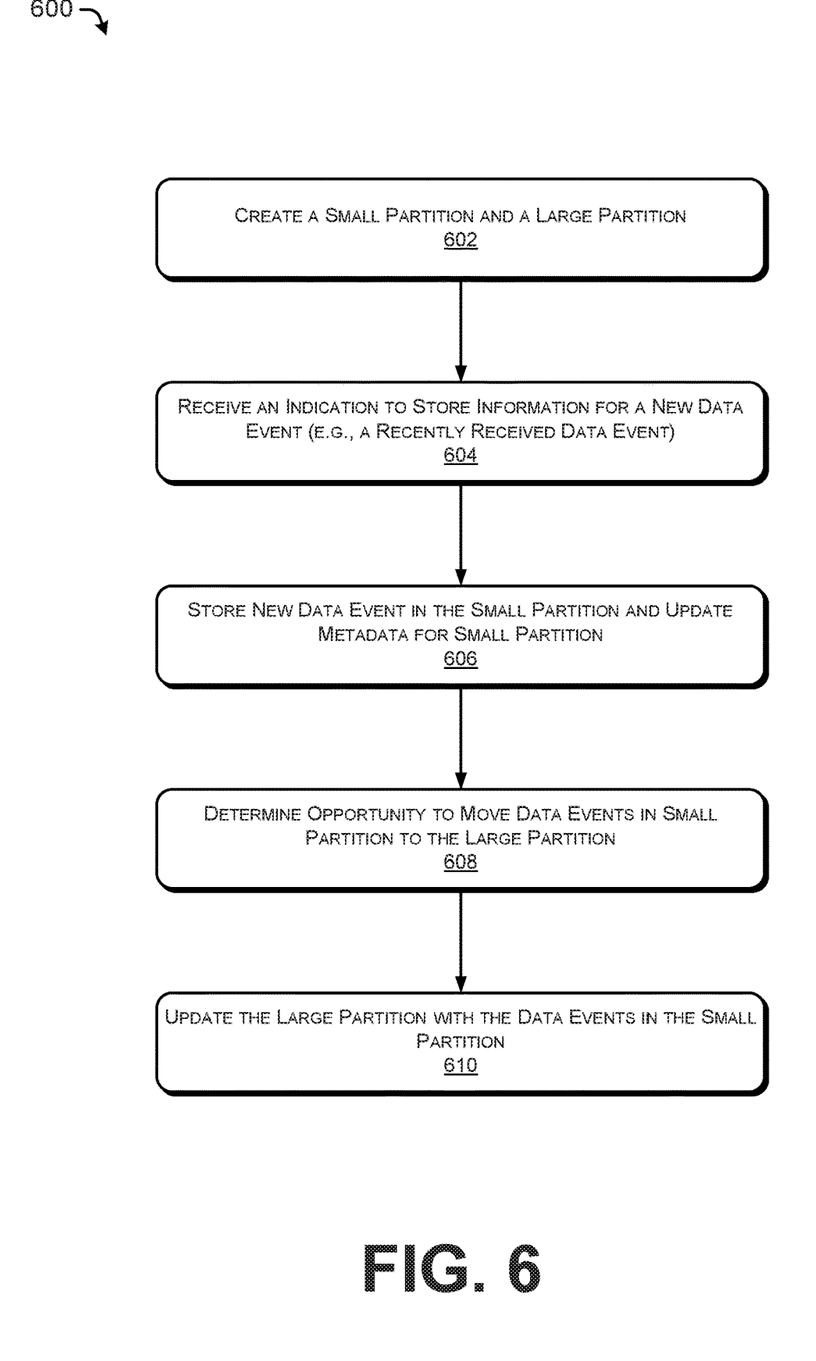
FIG. 6 illustrates an example process that separates the storage of data events between a small partition and a large partition, in accordance with various embodiments.

The data storage partitioning module 218 is further discussed herein with respect to FIG. 6.

As discussed above, existing mobile devices, when operating in the connected standby mode, wait for processing of a first data event to be completed before initiating reception of the next data event (e.g., data processing is coupled to data reception). However, during the time period when the mobile device is processing the data event, the data network interface is in a high energy consumption state waiting for completion of the processing even though no data is being exchanged (e.g., the network is idle). There is no data being exchanged because the data server 106 is waiting for the existing mobile device to process the first data event before sending the next data event. Once the data server 106 receives a notification (e.g., a processing acknowledgement or a PING packet) indicating that the first data event has been processed and the mobile device is ready to receive the next data event in the connected standby mode, the data server 106 may then begin sending a second data event.

This process may be repeated for additional data events ready to be communicated from the data server 106 to the existing mobile device. Accordingly, the data network interface on an existing mobile device unnecessarily operates in a high energy consumption state and consumes large amounts of energy even when network communications are idle, and this amount of time increases as a number of data events to be communicated from the data server 106 to the mobile device increases. In some instances, the data network interface may be configured to remain in the high energy consumption state during network idles times because the data network interface is configured to operate in accordance with a tail stage (e.g., 3G tail timer) to reduce or avoid network latency associated with an amount of time it takes to wake the data network interface up from a sleep state to begin receiving data. The second or subsequent data event transmissions may reset the tail timer each time, which keeps the data network interface in the high power consumption state for longer periods of times and thus, consumes more energy.

Figure 3:
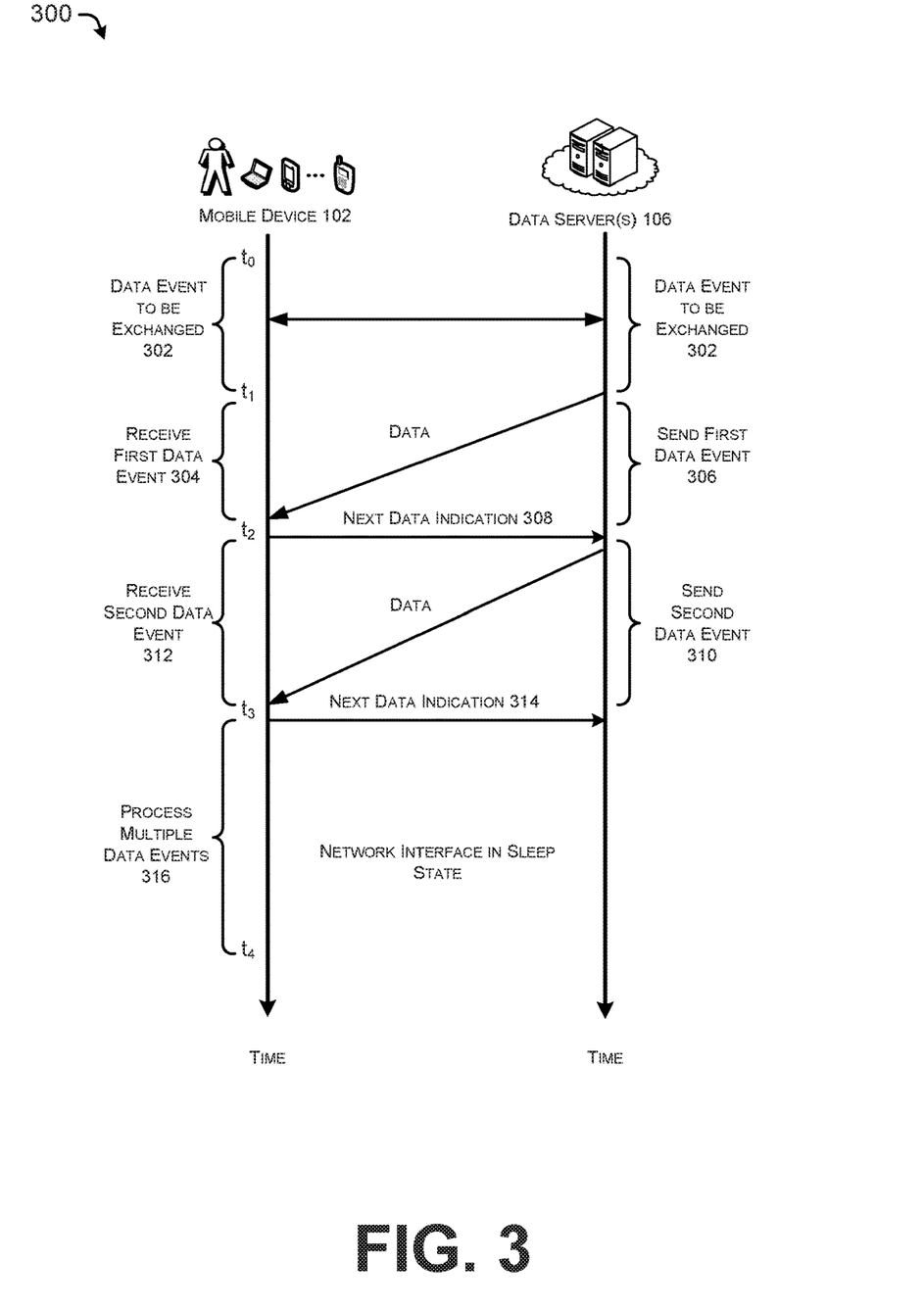
FIG. 3 illustrates a timing diagram showing the handling of multiple data events by a mobile device that decouples data reception from data processing, in accordance with various embodiments.

FIG. 3 illustrates an example timing diagram 300 of how the mobile device 102 configured with the energy saving data exchange module 116 discussed herein receives and processes multiple data events 104 in the connected standby mode. Moreover, FIG. 3 illustrates how decoupling the data processing from data reception allows the mobile device 102 to place the data network interface 128 in the low energy consumption state (e.g., sleep state) more quickly, and thus, eliminate some of the network idle times when the data network interface is unnecessarily operating in the high energy consumption state. Thus, FIG. 3 illustrates a time axis for the mobile device 102 and a data server 106. FIG. 3 shows the communication of two data events as an example. However, the techniques discussed herein are applicable to scenarios where there is more data events to be communicated from the data server 106 to the mobile device 102 (e.g., three, four, five, ten, twenty, and so forth).

During a first period from $t_0$ to $t_1$ the mobile device 102 and the data server 106 may determine that there is at least one data event to be exchanged 302. In various embodiments, the determination of data events to be exchanged 302 may involve, a push notification sent from the data server 106 to the mobile device 102, a pull request sent from the mobile device 102 to the data server 106 (e.g., an email sync request), Secure Sockets Layer (SSL) and/or TCP handshaking, or any other communications protocol to establish a connection or identify an existing connection.

During a second time period $t_1$ to $t_2$, the mobile device 102 may fully activate the data network interface 128 and receive a first data event 304 or fetch the first data event, and conversely, the data server 106 sends the first data event 306. At time $t_2$ (approximately), the mobile device 102 sends a next data indication 308 to the data server 106 so that the data server 106 knows the mobile device 102 is ready to receive the next data event even though the first data event may not yet be completely processed at the mobile device 102. Thus, during a third time period $t_2$ to $t_3$, the data server 106 can immediately begin sending the second data event 310 to the mobile device 102, and conversely, the mobile device 102 receives the second data event 312 and then sends another next data indication 314 after receiving the second data event. If the second data event is the last data event waiting to be communicated, the mobile device 102 can place the data network interface 128 into the sleep state, as illustrated (e.g., switch from the high energy consumption state of the connected standby mode to the low energy consumptions state of the connected standby mode). After placing the data network interface 128 in the sleep state, the mobile device 102 works to complete the processing of the multiple data events 316 during a fourth time period $t_3$ to $t_4$.

The differences between existing mobile devices that couple data reception with data processing and the illustration in FIG. 3, is that the mobile device 102 in FIG. 3 is able to place the data network interface 128 in a sleep state faster if the data reception is not dependent upon, or coupled to, the completed processing of the previous data event. Rather, as shown in FIG. 3, the mobile device 102 is able to fetch and download multiple or all data events without waiting for the processing of individual data events to be finished or completed. Therefore, the mobile device 102 configured with the energy saving data exchange module 116 is able to receive and/or process data events more energy-efficiently by eliminating multiple network idle times while the mobile device is processing individual events, and instead, receive and/or process data events more energy-efficiently.

In various embodiments, the next data indications in FIG. 3 may communicate an indication that the mobile device 102 is ready to receive next data event. The indication may include a predicted processing result, as discussed above. Moreover, in various embodiments, the operating system 114, the various applications illustrated in FIG. 1, and/or the modules and components associated with the energy saving data exchange module 116 may communicate using remote procedure calls (RPCs), e.g., to process, store and manage a data event.

Example operations are described herein with reference to FIGS. 4-6. The processes are illustrated as logical flow graphs, which represent a sequence of operations that can be implemented in hardware, software, or a combination thereof. In the context of software, the operations represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. Moreover, the example operations in FIGS. 4-6 may be described with reference to the features and/or elements illustrated in FIGS. 1-3.

FIG. 4 illustrates an example process 400 that decouples data reception from data processing in the connected standby mode. At block 402, the mobile device 102 determines that data is ready or waiting to be exchanged for one or more of the various communications applications configured or installed on the mobile device 102. For example, the determination may be made in response to a push notification received from a data server 106, a periodic email sync request (e.g., a pull request), a user initiated email sync request, and so forth.

At block 404, the mobile device 102 wakes up the data network interface 128 and/or the operating system 114 from the sleep state. To this end, the mobile device 102 is activated to a functional state capable of receiving and processing data events 104.

At block 406, the data network interface 128 and/or a communications application establish or identify a connection for exchanging the data with the data server. For example, the data network interface 128 and/or a communications application may implement a particular data communications protocol directed to securing a connection for the transfer of the data event 104.

At block 408, the data network interface 128 and the data event reception batching module 202 begin receiving a data event (e.g., unprocessed data of an email). For example, the data event may be an email, a first portion of an email, an instant message, a social networking message or notification, a gaming message or notification, and so forth.

At block 410, the data event reception batching module 202 batches (e.g., temporarily stores, holds, maintains, etc.) the unprocessed data as the data event is received or after the data event is received. In various embodiments, the operating system 114 and the communications application may begin actual processing of the unprocessed data at this time. However, as discussed herein, the reception of the next data event is not dependent upon, or coupled to, the successful completion of the processing of the unprocessed data. In alternative embodiments, the data event reception batching module 202 may batch the unprocessed data until all data events ready to be communicated by the data server 106 have been received at the mobile device 102. Then, the actual processing of the batched unprocessed data (e.g., associated with one or multiple data events) may begin.

In various embodiments, at block 412, the data event result predicting module 204 may predict a processing result of the data event. The data event result predicting module 204 may predict the processing result in a faster and more energy-efficient way compared to the actual processing of the unprocessed data. Thus, the energy saving data exchange module 116 may use the data event result predicting module 204 when the communications application and/or a corresponding data server 106 require a "successful" processing notification before communicating a next data event.

At block 414, the data event notification module 206 may send, to the data server 106, an indication that the mobile device 102 is ready to receive the next data event. As discussed above, the data event notification module 206 may send the indication immediately after the first data event is received and the unprocessed data for the first data event is batched. Thus, the mobile device 102 does not have to wait for the processing of the first data event to be completed before it begins to receive the next data event.

At block 416, the data event reception batching module 202 may communicate with the data sever 106 to determine whether or not the data server 106 has another data event to be communicated to the mobile device 102 over the established connection. If the answer to block 416 is "Yes", the process returns to block 408 and the data event reception batching module 202 receives the next data event, batches the data event, and so forth. In one implementation, the data event reception batching module 202 may determine whether or not the data server 106 has another data event to be communicated based on an initial notification communicated (e.g., the data server 106 tells the mobile device 102 of a number of data events that are queued and ready to be communicated). In another implementation, the mobile device 102 may poll the data server after receiving each data event to determine if another data event is waiting to be communicated. In yet another implementation, the mobile device 102 may determine that no additional data events are to be communicated after a predetermined amount of time expires and there are no additional data events communicated by the data server 106.

If the answer to block 416 is "No", the process moves to block 418 where the mobile device 102 places the data network interface 128 into the sleep state because there is no more data to be exchanged with the data server 106 (e.g., the mobile device switches from the high energy consumption state of the connected standby mode to the low energy consumption state of the connected standby mode). As discussed above, at the time the data network interface 128 switches to the sleep state, the processing of one or multiple data events may not be completed. Thus, the techniques discussed herein implement an approach that decouples data processing from data reception so that the mobile device 102 can place the data network interface 128 in the sleep state faster and energy can be preserved.

After the data network interface 128 is placed in the sleep state, at block 420, the data event processing module 208 may complete processing of the batched data events (e.g., batch process the unprocessed data of multiple data events). As mentioned above, in some implementations, the processing of the batched data events may begin while the data network interface 128 is still receiving subsequent data events, but the processing may not be completed. In alternative implementations, the processing of the batched data events begins after all the data events are received and batched.

The example process 400 may be executed on the mobile device 102 each time data events for a communications application on the mobile device 102 are queued at a corresponding data server 106, and ready to be transmitted by the corresponding data server 106 to the mobile device 102 while the mobile device is operating in the connected standby mode.

FIG. 5 illustrates an example process 500 that batches (e.g., temporarily stores, holds, or maintains) persistent memory operations for multiple data events. In at least one implementation the persistent memory operations are persistent memory writes that occur after a data event is received and/or processed in the connected standby mode with respect to FIG. 4. As discussed above, performing individual persistent memory writes for each data event consumes a significant amount of energy (e.g., processor and operating system use). Thus, the example process 500 conserves energy by batching multiple writes, and then committing or flushing them to persistent memory in a single operation at a later time.

At block 502, the persistent memory operation batching module 210 determines that a persistent memory operation associated with a data event is ready to be performed. For example, an email message may have been received and processed at the mobile device, as discussed above with respect to FIG. 4. Thus, the email message may be ready to write to persistent memory 216 (e.g., to be stored by the mobile device 102).

At block 504, the persistent memory operation batching module 210 batches the persistent memory operation (e.g., the write) and the data to be written in non-persistent memory cache 214 (e.g., a temporary cache, etc.).

After the memory operation is batched, at block 506, the persistent memory operation batching module 210 determines whether a trigger to commit or flush the batched persistent memory operations and data to persistent memory is received. In one embodiment, the trigger may be a pre-defined data threshold (e.g., 50 kilobytes, 100 kilobytes, 500 kilobytes). In another embodiment, the trigger may be a predetermined number of persistent memory operations (e.g., ten writes for ten data events). In yet another embodiment, the trigger may be by the identification or other power consuming activities being performed on the mobile device 102. For example, the persistent memory operation batching module 210 may perform the batched persistent memory operations when a user powers on, or interacts with, the mobile device 102 to access emails. Performing the persistent memory operations at the same time as such other activities may have no or very minimal impact on the baseline power consumption, as the mobile device 102 may already be in a high energy consumption state.

If the answer at block 506 is "No", the process returns to block 502 where the persistent memory operation batching module 510 determines that another persistent memory operation associated with another data event is ready to be performed, and then the persistent memory operation batching module 510 will add the persistent memory operation to the current batch in the non-persistent memory cache 214.

If the answer at block 506 is "Yes", then the process moves to block 508 where the persistent memory operation batching module 510 performs the batched persistent memory operations together (e.g., batch process multiple persistent memory writes). For example, the persistent memory operation batching module 510 may write multiple data events from the non-persistent memory cache 214 to persistent memory 216 together or as a group (e.g., commit or flush the batch).

FIG. 6 illustrates an example process 600 that separates the storage of data events between a small partition and a large partition. In at least one implementation the data events are stored after the data events are received and processed in the connected standby mode of FIG. 4, and/or in association with the memory operation batching as discussed with respect to FIG. 5. As discussed above, by separating storage space for a particular communications application into a small partition and a large partition, the example process 600 conserves energy because a large amount of metadata does not need to be updated and/or searched. In some embodiments, the partitioning may apply to data events for multiple communications applications.

At block 602, the data storage partitioning module 218 creates a small partition 220 and a large partition 222. In various embodiments, the small partition 220 and the large partition 222 are each storage space in persistent memory 216 that is allocated to, or associated with, a particular communications application or multiple communications applications. Thus, the small partition 220 and the large partition 222 may comprise an email inbox or multiple email inboxes merged together, for example. The data storage partitioning module 218 may create the small partition 220 and the large partition 222 by separating the data events based on a time when they were received at the mobile device 102 from the data server 106. Thus, the small partition 220 is storage space for recent data events (e.g., recently received emails) and the large partition 222 is storage space for older data events.

In various embodiments, the data storage partitioning module 218 may configure the small partition 220 to store a threshold number of data events (e.g., the twenty most recent emails, the fifty most recent emails, the one hundred most recent emails) or to store a threshold amount of data (e.g., 500 kilobytes for any number of recent data events). Accordingly, the large partition 222 may store the rest of the data events, which is likely a much larger amount of data events (e.g., 10,000 emails) compared to an amount of data events in the small partition 220.

At block 604, the data storage partitioning module 218 receives an indication to store information for a new data event (e.g., a data event recently received at the mobile device 102).

At block 606, the data storage partitioning module 218 stores the new data event in the small partition 220 and updates metadata information for the small partition 220 based on the new data event without having to access the large partition 222 and/or update the metadata information for the large partition 222. Metadata information may include identification of a sender of a message, a size range of a message, flagged messages such as 'high' importance, whether or not there is an attachment, or any other information that may be used to organize or group data events in the partitions. As discussed above, the mobile device 102 is able to preserve energy when storing a new data event because it does not have to deal with the large partition 222.

At block 608, the data storage partitioning module 218 determines an opportunity to move data events in the small partition 220 to the large partition 222. For example, the data storage partitioning module 218 may periodically (e.g., each day, each week, etc.) move the data events in the small partition 220 to the large partition. In another example, the data storage partitioning module 218 may move data events when the user initiates a search for a data event on the mobile device 102.

At block 610, the data storage partitioning module 218 updates the information (e.g., metadata, data events) in the large partition 222 with at least some of the data events in the small partition 220 after an opportunity is determined.

CONCLUSION

Although the subject matter has been described in language specific to structural features and/or methodological acts, it is to be understood that the subject matter defined in the claims is not necessarily limited to the specific features or acts described above. Rather, the specific features and acts described above are described as example forms of implementing the claims.

What is claimed is:

1. A mobile device comprising:
one or more processors; and
computer storage media storing computer executable instructions that, when executed by the one or more processors, perform operations comprising:
while the mobile device is in a connected standby mode, receiving a persistent memory operation for data associated with a data event at the mobile device, the connected standby mode configuring the mobile device to maintain a persistent connection to a data network from which the data associated with the data event is received;
while the mobile device is in the connected standby mode, storing, in a temporary cache of the mobile device, the persistent memory operation and the data associated with the data event; and
based on receiving a trigger to commit the stored persistent memory operation and the data, performing, on the data, the persistent memory operation to a persistent memory of the mobile device.

2. The mobile device as recited in claim 1, wherein the trigger is received in response to reaching a predetermined data threshold stored in the temporary cache.

3. The mobile device as recited in claim 2, wherein the trigger is received after a count of persistent memory operations stored in the temporary cache reaches a threshold number.

4. The mobile device as recited in claim 1, wherein the operations further comprise:
predicting a processing result for the data prior to completing processing of the data; and
determining whether to accept a transmission of second data based on the predicted processing result.

5. The mobile device as recited in claim 1, wherein performing the persistent memory operation occurs after a network interface of the mobile device is deactivated under a low energy consumption state of the connected standby mode.

6. The mobile device as recited in claim 1, wherein the persistent memory operation further comprises a persistent memory write operation.

7. The mobile device as recited in claim 1, further comprising:
receiving the persistent memory operation for second data associated with a second data event at the mobile device;
storing, in the temporary cache of the mobile device, the second data associated with the second data event; and
based on receiving the trigger to commit the stored persistent memory operation, the data, and the second data, performing the memory operation to the persistent memory of the mobile device.

8. The mobile device as recited in claim 7, wherein performing the memory operation to the persistent memory of the mobile device comprises:
performing, in a batched process on the data and the second data, the memory operation to the persistent memory of the mobile device.

9. A mobile device comprising:
one or more processors; and
computer storage media storing computer executable instructions that, when executed by the one or more processors, perform operations comprising:
creating a small partition and a large partition in persistent memory, wherein the small partition stores one or more data events, each of the one or more data events associated with metadata;
while the mobile device is in a connected standby mode:
receiving a new data event of the one or more data events,
storing the new data event in the small partition, and in response to storing the new data event in the small partition, updating the metadata associated with each of the one or more data events stored in the small partition;

determining an opportunity to move the new data event from the small partition to the large partition;

moving the new data event from the small partition to the large partition; and updating information in the large partition based on the new data event, wherein while the mobile device is in a connected standby mode, the mobile device is configured to maintain a persistent connection to a data network.

10. The mobile device of claim 9, wherein the small partition and the large partition are each allocations of space in persistent memory.

11. The mobile device of claim 9, wherein the new data event comprises an exchange of data, wherein the data comprises one of: an email message, an instant message, a social networking message, or a gaming message.

12. The mobile device of claim 9, wherein creating the small partition and the large partition further comprises:

separating the one or more data events into the small partition and the large partition, wherein newer data events of the one or more data events are stored in the small partition.

13. The mobile device of claim 9, wherein the small partition stores a threshold amount of data relating to the one or more data events.

14. The mobile device of claim 9, wherein the small partition stores a threshold number of data events.

15. The mobile device of claim 9, wherein the metadata includes information for organizing data events within one of the small partition or the large partition.

16. The mobile device of claim 9, further comprising:

in response to storing the new data event in the small partition, not updating metadata associated with the large partition.

17. A method of batching persistent memory operations for multiple data events in a mobile device, the method comprising:

while the mobile device is in a connected standby mode, receiving a persistent memory operation for data associated with a data event at the mobile device, the connected standby mode configuring the mobile device to maintain a persistent connection to a data network from which the data associated with the data event is received;

while the mobile device is in the connected standby mode, storing, in a temporary cache of the mobile device, the persistent memory operation and the data associated with the data event; and based on receiving a trigger to commit the stored persistent memory operation and the data, performing, on the data, the persistent memory operation to a persistent memory of the mobile device.

18. The method of claim 17, further comprising:

receiving the persistent memory operation for second data associated with a second data event at the mobile device;

storing, in the temporary cache of the mobile device, the second data associated with the second data event; and based on receiving the trigger to commit the stored persistent memory operation, the data, and the second data, performing the persistent memory operation to the persistent memory of the mobile device.

19. The method of claim 18, wherein performing the memory operation to the persistent memory of the mobile device comprises:

performing, in a batched process on the data and the second data, the memory operation to the persistent memory of the mobile device.

* * * * *